United States Patent
Ylä-Outinen et al.

(10) Patent No.: US 7,583,647 B2
(45) Date of Patent: Sep. 1, 2009

(54) CONTROLLER FOR CONTROLLING NUMBER OF REQUESTS SERVED BY A SERVER

(75) Inventors: Petteri Ylä-Outinen, Ojakkala (FI); Mika Mattila, Ruutana (FI); Janne Sillanpää, Viiala (FI)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 11/063,967

(22) Filed: Feb. 24, 2005

(65) Prior Publication Data

US 2006/0077899 A1    Apr. 13, 2006

(30) Foreign Application Priority Data

Oct. 7, 2004    (GB)    .................. 0422276.6

(51) Int. Cl.
*H04W 4/00*    (2006.01)
*H04W 72/00*   (2006.01)

(52) U.S. Cl. ............ 370/338; 370/235; 455/453; 718/105

(58) Field of Classification Search ......... 455/450–453; 370/229–236.2, 120, 395.21, 338; 718/105
See application file for complete search history.

(56) References Cited

U.S. PATENT DOCUMENTS

| | | | | |
|---|---|---|---|---|
| 5,274,644 A | * | 12/1993 | Berger et al. | 370/230 |
| 5,596,576 A | * | 1/1997 | Milito | 370/232 |
| 6,442,610 B1 | * | 8/2002 | Khanna et al. | 370/229 |
| 6,940,818 B2 | * | 9/2005 | Moran et al. | 370/235.1 |
| 7,236,458 B2 | * | 6/2007 | Lee et al. | 370/235.1 |
| 2002/0161925 A1 | * | 10/2002 | Munger et al. | 709/241 |
| 2003/0005122 A1 | | 1/2003 | Freimuth et al. | |
| 2006/0026598 A1 | * | 2/2006 | Handlogten et al. | 718/104 |
| 2006/0047751 A1 | * | 3/2006 | Chen et al. | 709/205 |
| 2006/0062144 A1 | * | 3/2006 | Testa et al. | 370/229 |

FOREIGN PATENT DOCUMENTS

| | | |
|---|---|---|
| EP | 0 772 324 A2 | 5/1997 |
| WO | WO 2004/066564 A1 | 8/2004 |

OTHER PUBLICATIONS

"A Buddy-based Load Balancing Algorithm for Multi-server File Systems Improving Serer Buffer Hit Probability", Jun. 1993, IBM Technical Disclosure Bulletin vol. 38, No. 06B, p. 569.*
Tannenbaum, A.S., "*Computer Networks, The Leaky Bucket Algorithm*", XP002245023, 1996, pp. 380-384.

* cited by examiner

*Primary Examiner*—Lester Kincaid
*Assistant Examiner*—Daniel Lai
(74) *Attorney, Agent, or Firm*—Squire, Sanders & Dempsey, L.L.P.

(57) ABSTRACT

A controller is configured for controlling the number of requests served by a server. The controller includes a pool for holding M tokens an input for providing tokens to the pool, and an output for removing tokens from the pool. The controller is configured such that a server request requiring at least one token to be handled, is only handled if the pool contains a required number of tokens for the request and the required number of tokens is removed via the output when the server request is to be handled by the server.

30 Claims, 3 Drawing Sheets

US 7,583,647 B2

CONTROLLER FOR CONTROLLING NUMBER OF REQUESTS SERVED BY A SERVER

FIELD OF THE INVENTION

The present invention relates to a controller for controlling the number of requests served by a server, a server and a method of controlling the number of requests served by a server.

BACKGROUND TO THE INVENTION

Servers are known in a number of different contexts. For example, in 3GPP (Third Generation Partnership Projects) or IP (Internet Protocol) architectures, users may subscribe to subscription services. An example of a subscription service is presence. The subscription service is initiated using subscription messages. In one known system, the subscription messages utilize SIP (session initiation protocol) messages. On detection of a subscribed event, a subscription server notifies the subscriber of the event using notification messages. In known systems, the subscription and notification messages are facilitated by a proxy server configured as a connection processing server (CPS). The subscription establishes an SIP dialogue through the CPS, and the CPS maintains that dialogue and it is used for all notifications. In this way, the CPS effectively records the route of the subscription.

The number of requests which can be served by a server may be limited. Servers may be arranged to implement mechanisms to protect the server from overload, for example load balancing in which the load rate is measured constantly and taken into account when making routing decisions, so that no single server gets overwhelmed. Overload conditions may occur if the request rate is too high. These overload mechanisms deal with overloading the server. However, none of the available solutions consider limiting the number of requests which are handled.

SUMMARY OF THE INVENTION

According to a first aspect of the present invention, there is provided a controller for controlling the number of requests served by a server, said controller comprising a pool for holding M tokens; an input for providing tokens to said pool; and an output for removing tokens from said pool, wherein said controller is arranged such that a server request requiring at least one token to be handled is only handled if said pool contains a required number of tokens for said request and said required number of tokens is removed via said output when said server request is to be handled by said server.

According to a second aspect of the present invention, there is provided a server for use with a controller comprising a pool for holding M tokens, said server being arranged to receive a request requiring at least one token from said pool to be handled, said server being arranged to determine the number of tokens to be required and to obtain said required number of tokens from said pool.

According to a third aspect of the present invention, there is provided a server for use with a controller comprising a pool for holding M tokens, said server being arranged to receive a request requiring at least one token from said pool to be handled, said server being arranged to determine if said required number of tokens is available from said pool and if not to discard said request.

According to a fourth aspect of the present invention, there is provided a method for controlling the number of requests served by a server, comprising the step of inputting tokens into a token pool; and determining if said pool contains a required number of tokens for handling a given request; and removing said required number of tokens when said server request is to be handled by said server.

According to a fifth aspect of the present invention, there is provide a method of controlling the number of requests served by a server, said method comprising the steps of receiving a request requiring at least one token from a pool of tokens to be handled; determining the number of tokens to be required; and obtaining said required number of tokens from said pool.

According to a sixth aspect of the present invention, there is provided a method of controlling the number of requests served by a server, said method comprising the steps of: receiving a request to be handled; determining if said request requires at least one token from a pool of tokens to be served; and if so obtaining said at least one token from said pool.

According to another aspect of the present invention, there is provided a method of controlling the number of requests served by a server, said method comprising the steps of: receiving a request requiring at least one token from a pool of tokens to be handled; determining if said required number of tokens is available from said pool; and if not, discarding said request.

BRIEF DESCRIPTION OF THE DRAWINGS

For a better understanding of the present invention and as to how the same may be carried into effect, reference will now be made by way of example only to the accompanying drawings in which.

DESCRIPTION OF PREFERRED EMBODIMENTS

An embodiment of the present invention is described herein by way of example with reference to a particular arrangement. However, the invention is not limited to the described embodiments.

Figure 1:
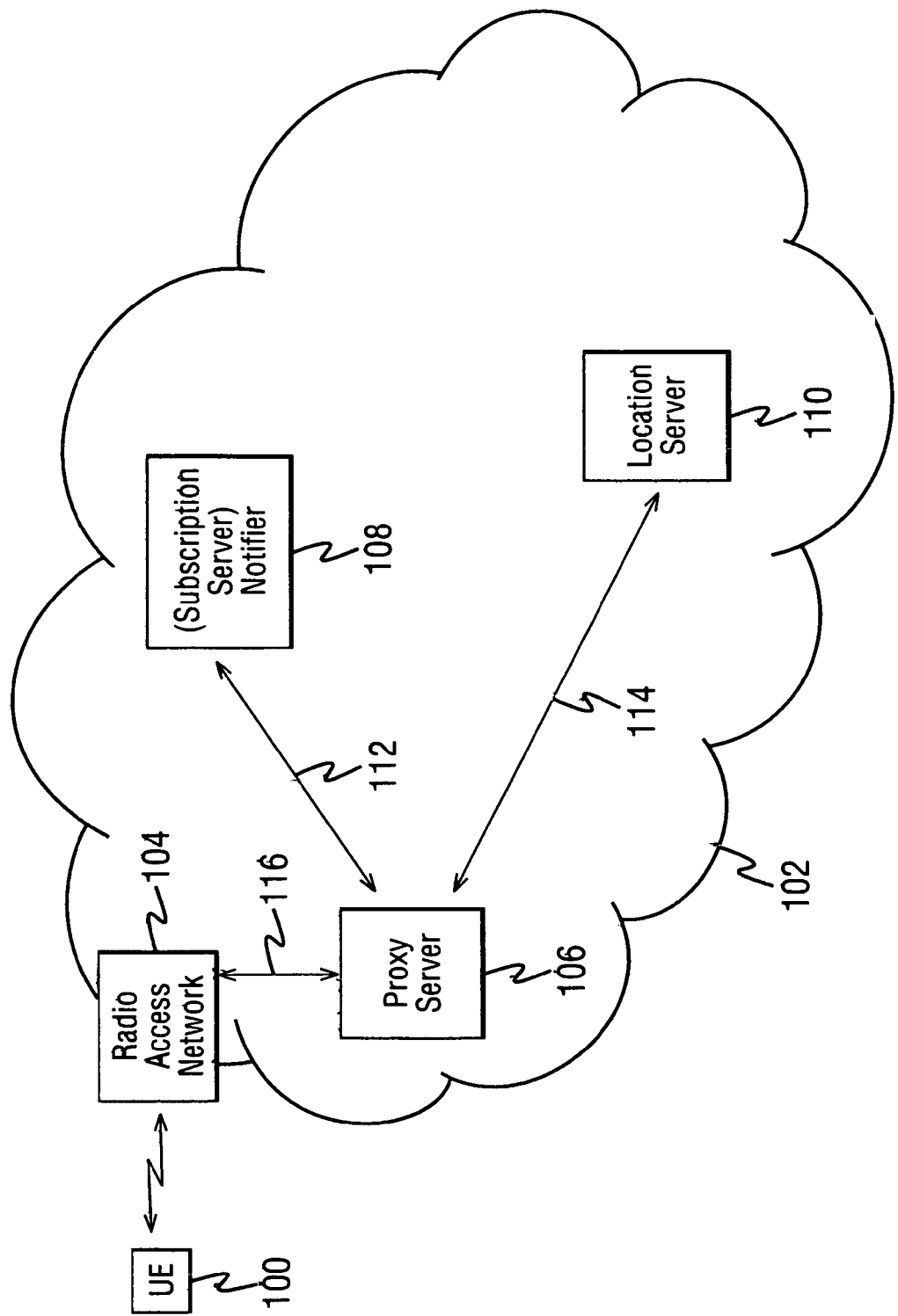
FIG. 1 illustrates a network scenario in which embodiments of the present invention can be incorporated.

A first embodiment to the present invention is now described with reference to FIG. 1. FIG. 1 illustrates elements of a mobile communications network in which an embodiment of the present invention may be implemented. The network shown in FIG. 1 is a GPRS (General Packet Radio Server) or UMTS (Universal Mobile Telecommunication System) communication network supporting a 3GPP or IP-architecture. Only those elements necessary for an understanding of the present invention are shown and described. Other elements necessary for implementation of the network would be known to one skilled in the art.

The network is generally designated by reference numeral 102. The network 102 is generally provided with a radio access network 104 which provides access to the network for mobile devices, such as user equipment (UE) 100. The network 102 has a proxy server 106 having connections 116 from the radio access network 104, a notifier 108 having connections 112 to the proxy server 106 and a location server 110 having connections 114 to the proxy server 106. The elements shown are required for the purpose of SIP-NOTIFY message routing. In one embodiment of the present invention, the location server in 3GPP IMS (IP multimedia subsystems)

is IMR (IP multimedia register)/HSS (home subscription server). In embodiments of the present invention, the notifier may be referred to as a subscription server.

It should be appreciated that embodiments of the present invention can be implemented with any or all of the three servers shown in FIG. 1.

In general, the user equipment initiates a subscription to a server. This involves messaging being sent from the user equipment to the proxy server and then from the proxy server to the subscription server.

The subscription server 108 stores identity information of the subscriber in its subscription data base. The subscription is then sent and the subscription server sends an acceptance message to the proxy server 106 which forwards the message to the user equipment. The subscription transaction and dialogue is thus complete.

Figure 2:
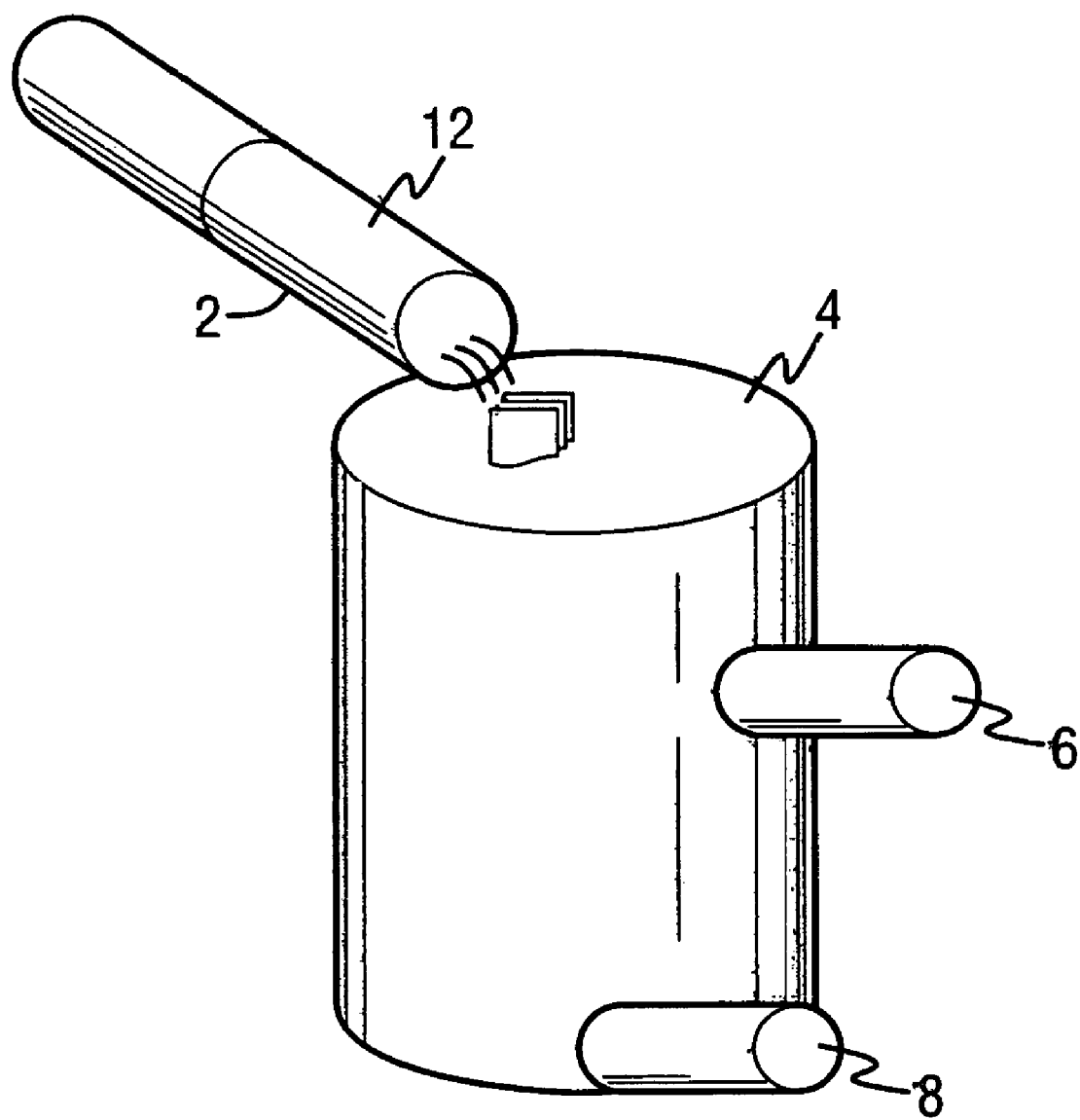
FIG. 2 shows schematically a controller for a server.
Figure 3:
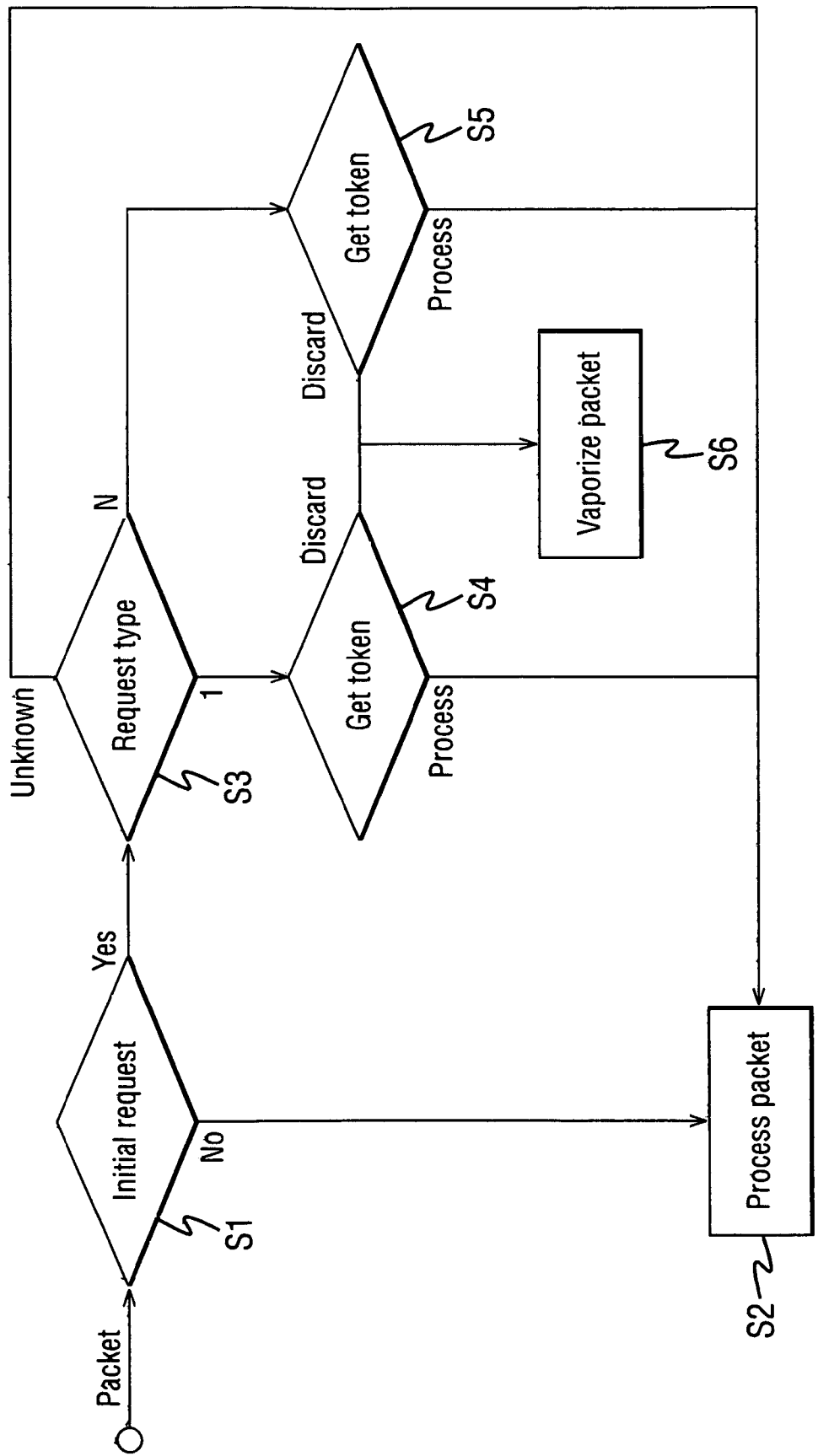
FIG. 3 shows a flow diagram of a method embodying the present invention.

Reference is now made to FIG. 2 and FIG. 3 which illustrate an embodiment of the present invention. In particular, these figures illustrate a mechanism to control the rate of the served requests. It should be appreciated that in the embodiment illustrated, it is possible that a server vendor is able to sell a licensed dynamic capacity to the operator of that server. Before describing the embodiment in more detail, some terminology used to describe the invention will now be defined:

Token—this is analogous to a ticket or the like required to process some request. In some embodiments of the present invention, it may be regarded as being a license.

Token Pool—this is for the storage of the tokens.

Token Supply—This is the mechanism to supply a certain amount or a chunk of tokens to t-he to-ken-pool.

Token Pipe—This is the mechanism to get the tokens from the token pool.

Overflow Pipe—This is the mechanism to control the maximum number of tokens in the token pool.

Token Chunk—This is a chunk of tokens which are together taken from the token supply to the token pool.

Input Period—Is the time between two successive moments when a token chunk is inserted in the token pool.

Filling Period—This is the time that it takes to fill the empty token pool from the token supply if there are no tokens used by taking them from the token pipe.

FIG. 2 shows the functionality of embodiments of the present invention whilst FIG. 3 shows a flow diagram illustrating the method embodying the present invention.

Referring first to FIG. 2, the token pool 4 is shown. The token pool has a token pipe 8. When a token is needed, it is taken from the token pool 4 via the token pipe 8. As long as there are tokens, they can be taken at what ever rate is required.

The token pool 4 also has an over flow pipe 6. When the token pool is full, all supplied tokens over flow. This effectively may mean that the tokens are discarded.

There may optionally be a mechanism which would stop the supply of tokens if the pool is full. However in terms of performance this may have little impact since the servers are rarely running idle and if indeed they are running idle then there is plenty of CPU capacity to use. There may be no consequences if the tokens are discarded. A token can be regarded as a permit to do something within a timeframe (e.g. establish session). If the token is not used, another new token will be available in the next timeframe.

The token pool 4 has a token supply 2 which is arranged to supply n tokens 12 to the token pool for each input period. By way of example, 10 tokens per second may be provided.

The token pool 4 is sized to hold the maximum number of filling period tokens. For example, the filling period may be 60 seconds. If the tokens can be supplied at a rate of 10 tokens per second, then the token pool will hold a maximum of 600 tokens. It should be appreciated that the selection of the size of the input and filling periods is an implementation issue. Whilst the input period is preferably of the order of a second, it may be larger or smaller than this. The filling period is preferably of the order of between 1 minute to one hour. The filling period is longer than the input period.

The token pool is sized to be generally such that the number of requests a server can handle in an input period is the number of token requests received in a filling period, for example 600 requests/operations per second although the steady rate is only 10 per second defined by the input period. Other numbers of requests, can be defined for the token pool in alternative embodiments of the invention.

It should be appreciated that this is one example of how the pool is sized. In different embodiments of the invention sizing of the pool may be dependent on the application which server is implementing.

This token pool illustrated in FIG. 2 may be implemented in hardware or in software. The token pool and the mechanisms illustrated in FIG. 2 may be provided in a server controller, the server itself, or as part of controlling equipment. In one embodiment of the present invention, the mechanism shown in FIG. 2 may be provided in an entity which is provided with a plurality of token pools. Each of those token pools can then be associated with a different server for example.

When the system starts up, the token pool can be either filled up with a maximum amount of tokens, or left empty. It is also possible that the token pool may be provided with a number of tokens which are insufficient to fill up the pool. This may be dependent on the agreement between the server vendor and the operator of that server. This may apply, where the server vendor sells a licensed dynamic capacity defined by the tokens to the operator of that server. Preferably, but not necessarily, the tokens are provided at a constant rate.

The token supply 2 can start to supply token chunks to the token pool at input period intervals. If the token pool contains tokens, then the tokens can be removed via the token pipe and used to process requests.

The token pool behaviour is such that if tokens are taken from the pool with a lower rate than the token supply which supplies them, then the token pool is eventually filled up to the overflow level. When the token pool is full, all the supplied tokens will overflow. The pool is full but new ones are discarded as long as the pool is full.

Whenever the system, ie the server, gets a request to handle, the system may check to see whether or not there is an available token from the token pool. Where a token is required for the request, the token is taken from the pool via the token pipe. Tokens can be taken from the pool as fast as the system can take from there. Because the token pool can have more tokens than one, it acts as reservoir which allows input periods of peak rate to exceed the specified request rate (token chunk/input period). This allows the system to process the request with a specified rate even if requests are not coming in with constant rate.

All the requests are handled as they come and the permit to handle the request is the token. If there is an input period as in the previous example, there is a steady rate of 10 requests per second which can be used without draining the pool. If this amount is not used every second, the pool is filled up and this is the reservoir. So taken from previous example if the pool is full it is possible to have 600 requests in one second but only 10 after that since the pool was drained before 10 were inserted (after every input period). This provides extra capability for an amount of time (depending on the size of the pool).

It should be appreciated that some requests may not require a token and in that case would bypass the token pool shown in FIG. 2. Certain classes or types or sources of request may not require the use of the token pool.

Reference is now made to FIG. 3 which shows the method embodying the present invention. In step S1, a packet is received by the system, i.e. the server. A check is made by the server, to see whether or not the packet is an initial request or a packet associated with a request that is already being dealt with. If it is determined in step S1 that the packet is not an initial request, then the next step is step S2 where the packet is processed.

If it is determined in step S1 that the packet is an initial request, then the next step is step S3. In step S3, the request type is analysed in the server. Depending on what the request type is determined to be will determine the next action. For example, for certain request types, the next step will be step S2 where the processing of the packet takes place. The request type may be analysed to determine which are the heavier operations and they can be defined to require e.g. 3 tokens when normal operations require only one, for example. Different request types can have different token tariffs.

If the request type is a type 1 request, then the next step is step S4 where a token is obtained. If it is not possible to obtain a token, then the next step is step S6, where the packet is discarded. If a token is obtainable, then the next step will be step S2 where the packet is processed. If the request type is a type N packet, the next step would be step S5 which would be to get the required number of tokens for the request. Depending on whether a token is available or not, the next step would be step S6 (in the case that not enough tokens are available) or step S2 (in the case that the tokens are available By way of example, a streaming video session establishment could have higher rate (more tokens required) than e.g. a short message. "N" symbolizes the amount of tokens required (the weight of the operation). In embodiments of the invention, there may be several different weights (1 to N). In preferred embodiments of the invention, the number of weights may be equal to or less than the number of tokens provided in the input period.

In the alternative, there may be N branches out from step S3 e.g. because for each known request type there can be individual token pools for different types e.g. voice call, video call, message, presence or the like. The different token pools may assign different numbers of tokens to a request. Alternatively the different token pools may use tokens representing different weights so that the token from one pool is not equivalent to a token from a different pool. The different pools may have different filling or input periods, different delivery rates for the tokens and/or different capacities.

Embodiments of the present invention can be implemented in any suitable way. For example, one process in a system which takes care of requests, which are to be processed by the limiter, implementation can basically be a counter. For example, removing a token decreases the counter. Supplying tokens to the pool will result in the counter being incremented. The supply of tokens to the pool can be controlled by a timer. Every time the timer expires, the counter is increased with the number of tokens in the chunk. The counter is inhibited from increasing beyond the overflow limit.

In one embodiment of the present invention, there may be many processors handling those same requests. As an example there may be a total capacity for the server of a 100 requests/second. The server may consist of several nodes which can process the request and this 100 may be divided for example evenly between them.

Accordingly, there may be a mechanism to ensure that all of the processors or servers get approximately the same load. In an alternative embodiment of the present invention, it is possible to alter the size of the token chunk in order to adjust the load imbalance. The size of the token chunk can be controlled dynamically to taken into account current loading. In embodiments of the present invention, the tokens can be regarded as being license. Accordingly, embodiments of the present invention enable a business model for licensing a dynamic capacity.

Embodiments of the present invention have been described in the context of a server used in an IMS system. It should be appreciated that embodiments of the present invention can be applied to any server in any scenario.

The invention claimed is:

1. An apparatus, comprising:
a processor configured to
receive tokens and to provide the tokens to a plurality of different pools, wherein each of the plurality of different pools is associated with a different server, and wherein one pool of the plurality of different pools is configured to hold M tokens, and
remove tokens from said plurality of different pools, wherein
said processor is configured such that, when it is determined that a server request is of a type that requires at least one token to be removed from said one pool for said server request to be handled, and that said server request requires a determined number of tokens to be removed from said one pool for said server request to be handled, then said server request is handled when said one pool contains said determined number of tokens for said request and said determined number of tokens is removed when said server request is handled by the server with which said one pool is associated.

2. An apparatus as claimed in claim 1, wherein each of a plurality of different types of requests require a different number of tokens.

3. An apparatus as claimed in claim 1, wherein said processor is configured to receive the tokens and to provide said tokens to said one pool at a constant rate.

4. An apparatus as claimed in claim 1, wherein said processor is configured to receive a predetermined number of tokens and to provide the predetermined number of tokens during a first period to said one pool.

5. An apparatus as claimed in claim 4, wherein said first period is defined in seconds and is around 1 second.

6. An apparatus as claimed in claim 1, wherein said processor is configured to fill said one pool from empty within a second period.

7. An apparatus as claimed in claim 6, wherein said second period is one minute.

8. An apparatus as claimed in claim 6, wherein said second period is between one minute and one hour.

9. An apparatus as claimed in claim 1, wherein the one pool is sized to accommodate a maximum number of requests that can be handled by said server with which said one pool is associated in a predetermined time.

10. An apparatus as claimed in claim 1, wherein the processor is further configured to discard tokens that are received when said one pool is full of tokens.

11. An apparatus as claimed in claim 1, wherein the processor is configured to assign each of a plurality of different request types to different pools of the plurality of different pools.

12. An apparatus as claimed in claim 1, wherein said request comprises at least one of a voice call, a video call, a message, and a presence.

13. An apparatus as claimed in claim 1, wherein said token comprises a license.

14. An apparatus as claimed in claim 1, wherein said processor comprises a counter.

15. An apparatus as claimed in claim 1, wherein the apparatus comprises or is part of a server.

16. An apparatus, comprising:
   means for receiving tokens and providing the tokens to a plurality of different pool means, wherein each of the plurality of different pool means is associated with a different server, and wherein one pool means of the plurality of different pool means is configured to hold M tokens, and
   output means for removing tokens from said plurality of different pool means, wherein
   when it is determined that a server request is of a type that requires at least one token to be removed from said one pool means for said server request to be handled, and that said server request requires a determined number of tokens to be removed from said one pool means for said server request to be handled, then said server request is handled when said one pool means contains said determined number of tokens for said request and said determined number of tokens is removed when said server request is handled by the server with which said one pool is associated.

17. A method, comprising:
   determining, by a processor, that a server request is of a type that requires at least one token to be removed from a token pool for said server request to be handled;
   determining, by the processor, that said server request requires a predetermined number of tokens to be removed from said token pool for said server request to be handled; and
   handling, by the processor, said server request when said token pool contains said predetermined number of tokens for said request by removing said predetermined number of tokens when said server request is handled by a server with which said token pool is associated, wherein
   the processor is configured to receive tokens and to provide the tokens to, and remove tokens from a plurality of different pools that include said token pool, wherein each of the plurality of different pools is associated with a different server, and wherein the token pool is configured to hold M tokens.

18. A method as claimed in claim 17, wherein each of a plurality of different types of requests require a different number of tokens.

19. A method as claimed in claim 17, comprising receiving, by the processor, the tokens and providing, by the processor, the tokens to said token pool at a constant rate.

20. A method as claimed in claim 17, comprising receiving, by the processor, a predetermined number of tokens and providing, by the processor, the predetermined number of tokens during a first period to said token pool.

21. A method as claimed in claim 20, wherein said first period is defined in seconds and is around 1 second.

22. A method as claimed in claim 17, wherein said token pool is filled, by the processor, from empty within a second period.

23. A method as claimed in claim 22, wherein said second period is one minute.

24. A method as claimed in claim 22, wherein said second period is between one minute and one hour.

25. A method as claimed in claim 17, wherein the token pool is sized to accommodate a maximum number of requests that can be handled by said server with which said token pool is associated in a predetermined time.

26. A method as claimed in claim 17, further comprising discarding, by the processor, tokens that are received when said token pool is full of tokens.

27. A method as claimed in claim 17, further comprising assigning, by the processor, each of a plurality of different request types to different pools of the plurality of different pools.

28. A method as claimed in claim 17, wherein said request comprises at least one of a voice call, a video call, a message, and a presence.

29. A method as claimed in claim 17, wherein said token comprises a license.

30. A computer program embodied on a computer-readable storage medium, the program configured to control a processor to perform a process, the process comprising:
   determining that a server request is of a type that requires at least one token to be removed from a token pool for said server request to be handled;
   determining that said server request requires a predetermined number of tokens to be removed from said token pool for said server request to be handled; and
   handling said server request when said token pool contains said predetermined number of tokens for said request by removing said predetermined number of tokens when said server request is handled by a server with which said token pool is associated, wherein
   the processor is configured to receive tokens and to provide the tokens to, and remove tokens from, a plurality of different pools which include said token pool, wherein each of the plurality of different pools is associated with a different server, and wherein the token pool is configured to hold M tokens.

* * * * *

UNITED STATES PATENT AND TRADEMARK OFFICE
CERTIFICATE OF CORRECTION

PATENT NO. : 7,583,647 B2
APPLICATION NO. : 11/063967
DATED : September 1, 2009
INVENTOR(S) : Ylä-Outinen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Fourteenth Day of September, 2010

David J. Kappos
*Director of the United States Patent and Trademark Office*